(12) United States Patent
Anker et al.

(10) Patent No.: US 8,729,144 B2
(45) Date of Patent: May 20, 2014

(54) FIBRE REINFORCED PROPYLENE FOAM

(75) Inventors: Martin Anker, Hisings Kärra (SE); Per-Ola Hagstrand, Stenungsund (SE); Manfred Stadlbauer, Linz (AT)

(73) Assignee: Borealis Technology Oy, Porvoo (FI)

(*) Notice: Subject to any disclaimer, the term of this patent is extended or adjusted under 35 U.S.C. 154(b) by 218 days.

(21) Appl. No.: 12/097,219

(22) PCT Filed: Nov. 15, 2006

(86) PCT No.: PCT/EP2006/010967
§ 371 (c)(1),
(2), (4) Date: Jul. 23, 2008

(87) PCT Pub. No.: WO2007/073803
PCT Pub. Date: Jul. 5, 2007

(65) Prior Publication Data
US 2008/0283791 A1    Nov. 20, 2008

(30) Foreign Application Priority Data

Dec. 23, 2005 (EP) .................................. 05028435

(51) Int. Cl.
*C08F 110/06*   (2006.01)

(52) U.S. Cl.
USPC ............... 521/79; 521/83; 521/134; 521/143; 525/240

(58) Field of Classification Search
USPC ...................... 521/79, 83, 134, 143
See application file for complete search history.

(56) References Cited

U.S. PATENT DOCUMENTS

| | | | |
|---|---|---|---|
| 3,474,048 A * | 10/1969 | Chappelear et al. ............ 521/60 |
| 4,205,583 A | 6/1980 | Absmann | |
| 5,122,398 A | 6/1992 | Seiler et al. | |
| 5,707,571 A * | 1/1998 | Reedy .......................... 264/45.3 |
| 6,300,555 B1 * | 10/2001 | Kondo et al. .................. 136/244 |
| 6,388,020 B2 | 5/2002 | Rätzsch et al. | |

FOREIGN PATENT DOCUMENTS

| | | |
|---|---|---|
| EP | 0 432 997 | 12/1990 |
| EP | 0 787 750 | 5/2003 |
| JP | 04110129 A * | 4/1992 |
| JP | 2001105982 A * | 4/2001 |
| WO | WO 02/07969 | 1/2002 |
| WO | WO 02/38621 | 5/2002 |

OTHER PUBLICATIONS

International Preliminary Report on Patentability (includes: International Search Report for International Application No. PCT/EP2006/010967 and Written Opinion for International Application No. PCT/EP2006/010967.
"Thermal Conductivity and Thermal Diffusivity Measurements in Sisal Fibre, Glass Fibre and Intimately Mixed Sisal/Glass Hybrid Fibre Reinforced Low Density Polyethylene Composites," *Polymer* (1999); Chapter 9, pp. 228-247.
David Hartman, Mark E. Greenwood and David M. Miller, "High Strength Glass Fibers," AGY Technical Paper; (2006); pp. 1-12.

* cited by examiner

*Primary Examiner* — Irina S Zemel
(74) *Attorney, Agent, or Firm* — Fay Sharpe LLP

(57) ABSTRACT

The present invention relates to a foamed polypropylene composition comprising a propylene homo- and/or copolymer and glass fibres, wherein (i) the composition has a density of 50 to 950 kg/m$^3$, (ii) the tensile modulus $tm_{(extrusion\ direction)}$ measured according to ISO 527 in extrusion direction and the k-value measured according to ASTM C-518 satisfy the relation: $tm_{(extrusion\ direction)}$ [MPa]/k [W/mK]≥9000 MPa·mK/W, to the use of said composition for the production of an insulating layer and to an article comprising said composition.

15 Claims, 1 Drawing Sheet

FIBRE REINFORCED PROPYLENE FOAM

The present invention relates to a fibre reinforced foamed polypropylene composition with improved mechanical and heat insulating properties, to the use of such a composition for the production of an insulating layer, in particular an insulating layer of a steel pipe, and to an article, in particular a steel pipe, comprising the composition.

For steel pipe coating material systems used for deep water offshore applications, a combination of low thermal conductivity and good mechanical properties is essential. It is known for this purpose to use foamed polypropylene as described e.g. in WO 02/07969. However, in order to sustain the hydrostatic pressure especially at high depths, the foam must have excellent mechanical properties, and thus relatively dense foams are needed. As a result, the thermal conductivity becomes relatively high and consequently thick insulating layers are needed.

It is thus desirable to provide a foam which, at the same time, has improved mechanical properties and also decreased thermal conductivity so that either thickness of an insulating layer can be reduced or that the insulation can be used at higher depths.

The concept of reinforcing polymeric foams by fibres is e.g. known from EP 432 997. In this document, foamed materials such as polystyrene and polyphenols are described which are reinforced by composite fibres.

However, it was hitherto unknown how incorporation of fibres would affect especially the thermal insulating and the foaming properties of a polypropylene composition which is especially designed for use as an insulation layer, in particular for a steel pipe.

It has now been surprisingly found that incorporation of glass fibres into a foamed polypropylene composition not only leads to improved mechanical properties of the foam but at the same time provides the foam with improved thermal insulating properties such as a decreased thermal conductivity.

Accordingly, the present invention provides a foamed polypropylene composition comprising a propylene homo- and/or copolymer and glass fibres, wherein
(i) the composition has a density of 50 to 950 kg/m$^3$.
(ii) the tensile modulus $tm_{(extrusion\ direction)}$ measured according to ISO 527 in extrusion direction and the k-value measured according to ASTM C-518 satisfy the relation:

$$tm_{(extrusion\ direction)}\ [MPa]/k\ [W/mK] \geq 9000\ MPa \cdot mK/W.$$

The foams according to the invention have a combination of improved mechanical properties, in particular improved tensile modulus in both extrusion and transverse to extrusion direction, and improved thermal properties, in particular a decreased k-value indicative of a lower thermal conductivity, compared to a foam without glass fibres with the same density.

It is thus possible to construct steel pipes with an insulation layer comprising the foamed composition according to the invention which can be installed at higher depths, i.e. at higher hydrostatic pressure, or to reduce the thickness of the insulation layer and hence save costs and weight.

The k-value denotes a material's effective thermal conductivity, i.e. how well a material will conduct (transfer) heat, and hence k-values as low as possible are desired for insulating properties.

Preferably. the tensile modulus $tm_{(extrusion\ direction)}$ measured according to ISO 527 in extrusion direction and the k-value measured according to ASTM C-177 satisfy the relation:

$$tm_{(extrusion\ direction)}\ [MPa]/k\ [W/mK] \geq 10000\ MPa \cdot mK/W,$$

more preferably satisfy the relation:

$$tm_{(extrusion\ direction)}\ [MPa]/k\ [W/mK] \geq 11000\ MPa \cdot mK/W,$$

and most preferably satisfy the relation:

$$tm_{(extrusion\ direction)}\ [MPa]/k\ [W/mK] \geq 13000\ MPa \cdot mK/W.$$

Usually, for the relation $tm_{(extrusion\ direction)}$ [MPa]/k [W/mK] values of up to 20000 MPa·mK/W and even up to 25000 MPa·mK/W may be obtained with the polypropylene composition according to the invention.

Furthermore, preferably the tensile modulus $tm_{(transverse)}$ measured according to ISO 527 in transverse to extrusion direction and the k-value measured according to ASTM C-518 satisfy the relation:

$$tm_{(transverse)}\ [MPa]/k\ [W/mK] \geq 6000\ MPa \cdot mK/W,$$

more preferably satisfy the relation:

$$tm_{(transverse)}\ [MPa]/k\ [W/mK] \geq 6500\ MPa \cdot mK/W,$$

and most preferably satisfy the relation:

$$tm_{(transverse)}\ [MPa]/k\ [W/mK] \geq 7000\ MPa \cdot mK/W.$$

Usually, for the relation $tm_{(transverse)}$ [MPa]/k [W/mK] values of up to 15000 MPa·mK/W and even up to 20000 MPa·mK/W may be obtained with the polypropylene composition according to the invention.

Furthermore, preferably, the foamed composition has a k-value of below 0.25 W/mK. Usually, the k-value is 0.01 W/mK or higher.

Furthermore, the foamed composition preferably has a $tm_{(extrusion\ direction)}$ in extrusion direction of at least 50 MPa. Usually, the $tm_{(extrusion\ direction)}$ in extrusion direction is 4000 MPa or lower.

In the foamed polypropylene composition according to the invention, average length of the glass fibres preferably is between 0.2 to 50 mm, more preferably is between 0.5 and 25 mm, still more preferably is between 1.0 to 20 mm, and most preferably is 1.0 to 10 mm.

The glass fibres may be cut to the appropriate length and then be added to the composition in a compounding step before the composition is foamed.

Alternatively and preferably, the glass fibres may be added to the composition in the form of a masterbatch, in which the glass fibres are present in a polymer, preferably polypropylene, matrix, in high concentration. In such a masterbatch, the glass fibres may originally have a higher length as needed in the final composition, and the length of the glass fibres may then be adjusted by chopping the masterbatch into pieces with appropriate dimensions.

Such masterbatches are, for example, commercially available. One masterbatch which may be used is Nepol GB415HP, available from Borealis A/S, Denmark. It contains 42 wt. % of glass fibres. The polypropylene is impregnated with the glass fibres, shaped, cooled and subsequently cut to rods of preferably approximately 1 to 10 mm. Such prepared Nepol masterbatch may be dosed through the hopper of the foaming extruder. However, any other glass fibre or glass fibre masterbatch may be used for that purpose as well.

Preferably, in the foamed polypropylene composition the glass fibres are present in an amount of from 1 to 30 wt. %, more preferably from 2 to 25 wt. %, still more preferably from 5 to 20 wt. %, and most preferably from 6 to 15 wt. % of the total composition.

In a preferred embodiment, in the foamed polypropylene composition the propylene homo- and/or copolymer comprises a component (A) which is a high melt strength propylene homo- or copolymer, preferably a long-chain branched propylene homopolymer, and which shows strain hardening behaviour.

A propylene polymer showing strain hardening behaviour is defined to have an enhanced strength with a haul-off force F>15 cN and enhanced drawability with a draw-down velocity v>150 mm/s.

Such propylene polymers may be obtained by modifying a propylene homo- and/or copolymer by a number of processes, such as treatment of the unmodified propylene polymer with thermally decomposing radical-forming agents and/or by treatment with ionizing radiation, where both treatments may optionally be accompanied or followed by a treatment with bi- or multifunctionally unsaturated monomers, e.g. butadiene, isoprene, dimethylbutadiene or divinylbenzene. In particular, it is referred to EP 787 750 and WO 02/07969 and the references cited therein, in which the production of propylene polymers showing strain hardening behaviour is described.

Furthermore, in the foamed polypropylene composition preferably the propylene homo- and/or copolymer comprises a component (B) which is a propylene homo- and/or copolymer with high impact strength, in particular is a block copolymer from ethylene and propylene with an ethylene content of up to 10 wt. %.

Preferred propylene polymers for component (B) are disclosed e.g. in WO 02/38621.

In a particularly preferred embodiment, in the foamed polypropylene composition the propylene homo- and/or copolymer comprises
   (A) 5 to 80 wt. % of a propylene homo- and/or copolymer which shows strain hardening behaviour, and
   (B) 20 to 95 wt. % of a propylene homo- and/or copolymer having a Charpy Notched Impact Strength at 23° C. measured according to ISO 179/1eA of 25 kJ/m$^2$ or higher.

Furthermore, preferably at least one of components (A) and (B) have a tensile modulus measured according to ISO 527 of 1500 MPa or higher.

Preferably, component (A) has a MFR$_2$ of 0.05 to 10 g/10 min.

Further, preferably component (B) has a MFR$_2$ of 0.05 to 20 g/10 min.

Component (B) preferably has a Charpy Notched Impact Strength at −20° C. measured according to ISO 179/1 eA of 1 kJ/m$^2$ or higher.

Further preferred, in the foamed polypropylene composition comprising components (A) and (B), component (B) is a homopolymer with a sterospecificity index >98% and a MFR$_2$ of 0.05 to 10 g/10 min and/or a copolymer of 99.9 to 80 wt. % propylene and 0.1 to 20 wt. % of ethylene or an alpha-olefin with 4 to 18 carbon atoms with a stereospecificity index of >96% and a MFR$_2$ of 0.05 to 10 g/10 min.

Such polypropylene compositions comprising components (A) and (B) are described e.g. in WO 02/07969. The content of this application and, in particular all preferred embodiments of components (A) and (B) are enclosed to the present application.

Preferably, the foamed composition of the invention has a Charpy impact strength (23° C.) of 5 kJ/m$^2$ or more, still more preferably 7 kJ/m$^2$ or more and most preferably 10 kJ/m$^2$ or more.

Furthermore, preferably the foamed composition has a Charpy impact strength (−20° C.) of 3 kJ/m$^2$ or more, more preferably of 5 kJ/m$^2$ or more.

The foamed propylene in addition to components (A) and (B) may further comprise additives in usual amounts, normally not more than 30 wt. %.

In particular, the composition may comprise 0.01 to 2.5 wt. % of a stabilizer, 0.01 to 1 wt. % of a processing agent, 0.1 to 1 wt. % of an antistat, 0.2 to 3 wt. % of a pigment and up to 20 wt. % of a filler.

In a preferred embodiment, the foamed polypropylene composition comprises 0.1 to 5 wt. %, more preferably 0.1 to 2.5 wt. % of an alpha-nucleating agent.

Preferably, as a cell nucleating agent a commercial masterbatch is used (e.g. Hydrocerol CF40, manufactured from Clariant). However, any foam cell nucleating agent known from literature (e.g. talc, chalk, nanofillers, etc.) may be used for that purpose.

Preferably, the foamed composition has a density of from 100 to 900 kg/m$^3$, more preferably from 150 to 850 kg/m$^3$.

If the foamed polypropylene composition is intended for use as insulating layer of a multilayer pipe, such as a polyolefin coated steel pipe with an inner steel layer, an intermediate foamed polypropylene layer and an outer, unfoamed layer, the preferred density of the foamed composition is 250 to 850 kg/m$^3$, more preferably is 300 to 850 kg/m$^3$ and most preferably is 300 to 750 kg$^3$.

The foamed polypropylene composition can also be used for e.g. multi layer pipes with an inner and outer solid polymer layer. Preferably, the density of the foamed polypropylene composition when used for the production of a multi layer pipe with an inner and outer solid polymer layer is from 150 to 700 kg/m$^3$, more preferably from 250 to 600 kg/m$^3$.

For foaming the polypropylene composition according to the invention, any physical or chemical foaming agent may be used.

For examples, as a physical foaming agent (PBA), preferably carbon dioxide can be used. However, other foaming agents, such as, for example nitrogen, butane, pentane or water, may be used as well.

A chemical foaming agent is defined to be a chemical substance that decomposes or reacts by the influence of heat. In direct gas foaming processes the "chemical foaming agents" may also be used as "nucleating agents" to produce uniform and fine cell structures.

As chemical foaming agent (CBA) for the purpose of the present invention, for example commercially available Hydrocerol CF70, manufactured from Clariant, Germany may be used. Hydrocerol CF70 is a chemical foaming and nucleating agent masterbatch for foaming of thermoplastic resins, containing effective components in an amount of 70 wt %. At polypropylene extrusion conditions it releases carbon dioxide which acts as foaming agent. However, any other chemical foaming agent may be used for that purpose as well.

The present invention furthermore relates to the use of the foamed polypropylene composition as described above for the production of a thermal insulating layer, in particular for the production of a thermal insulating layer of a pipe, especially a coated steel pipe.

Still further, the present invention relates to an article comprising the foamed polypropylene composition as described above, in particular to a multilayer coated steel pipe.

Multilayer coated steel pipes usually comprise an inner steel layer, an intermediate layer of a foamed polyolefin composition, in particular comprising the foamed polypropylene composition according to the invention, and an outer unfoamed polymer layer.

Preferably, for a good interlaminar adhesion between the steel pipe and the foamed polypropylene layer, an epoxy resin coated steel pipe is used and a compatibilizing layer between the epoxy resin coated steel pipe and the foamed polypropylene layer is applied, whereby the compatibilizing layer comprises propylene copolymers or propylene graft copolymers both with chemically bound ethylenically unsaturated carbonic acids and/or carbonic anhydrides, particularly acrylic acid, methacrylic acid, and/or maleic anhydride.

For example, such a multilayer coated steel pipe may be produced by coating extruder/rotating steel pipe technology or by crosshead die pipe coating technology.

Preferably, in the production of a coated steel pipe, the composition before foaming contains up to 12 wt. % of a chemical foaming agent.

In producing the polyolefin foam coated steel pipe by extruding/rotating steel pipe technology, the preheated steel pipe which is optionally coated with an epoxy resin layer, is kept under rotation and is successively melt coated by independent coating extruders having flat film dies with layers of, optionally, a compatibilizing agent, the foaming propylene polymer mixture, and the unfoamed polymer cover layer.

In producing the polyolefin foam coated steel pipe by crosshead die pipe coating technology, it is preferred to use a crosshead fed by two extruders, one for the polyolefin foam layer and the second for the outer unfoamed polymer layer. The steel pipe is pre-treated by optionally coating it with an epoxy layer, an adhesive layer and finally a solid layer.

The invention is now further illustrated by reference to the figures.

EXPERIMENTAL AND EXAMPLES

1. Definitions and Measurement Methods a) Density

The density has been measured according to the Archimedes principle through determining mass (m) and volume (V) of the specimen and calculating its density (d) accordingly (d=m/V).

$$d = \frac{m}{V}$$

b) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. and a loading of 2.16 kg ($MFR_2$).

c) Thermal Conductivity

The thermal conductivity measurement has been carried out according to ASTM C-518, Standard Test Method for Steady-State Thermal Transmission Properties by Means of Heat Flow Meter Apparatus.

The coefficient of thermal conductivity (k-value) is defined as:

$$\lambda = (Qd)/(\Delta TF)$$

where:

$\lambda$ Apparent Thermal conductivity (k-value) [W/mK]

Q Measured heat flow through the test specimen [W]

d Measured thickness of the test specimen [m]

$\Delta T$ Measured temperature difference between the warm and cold side of the test specimen [K]

F Measured area of the test specimen [$m^2$]

The k-value measurements were done on 24 sheets placed between two hot plates with a warm side temperature of 82° C. and cold side temperature of 76° C. The samples were cut into circular shape with a diameter of 50 mm and a height of approximately 30 mm. The sheets were joined together with a pressure of 0.69 kg/$cm^2$ throughout the measurement to ensure optimal contact between the sheets. The k-value measurement was carried out in steady state conditions with a steady-state time of 6-8 hours.

d) Tensile Properties

Tensile properties such as tensile modulus, tensile stress at yield, tensile strain at yield, tensile strength, tensile strain at tensile strength, and tensile strength at break have been measured according to ISO 527 in both extrusion and transverse to extrusion direction.

e) Charpy Impact Strength

Charpy impact strength was determined according to ISO 179/1eA on V-notched samples at 23° C. (Charpy impact strength (23° C.)) and −20° C. (Charpy impact strength (−20° C.)).

f) Strain Hardening Behaviour

Figure 1:
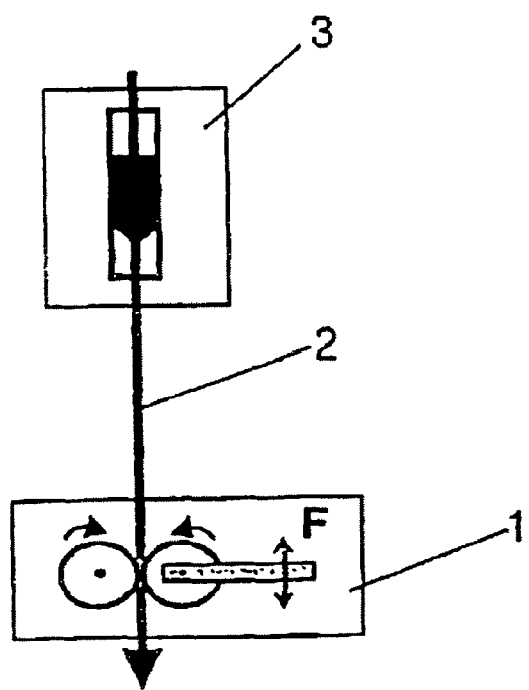
FIG. 1 shows a scheme for the measurement of the increase in haul-off force vs. increase in draw-down velocity.

Strain hardening behaviour is measured according to an experimental procedure illustrated in FIG. 1. The strain hardening behaviour is analysed by Rheotens apparatus 1 (product of Göttfert, Buchen, Germany) in which a melt strand 2 is elongated by drawing down which a defined acceleration. The haul-off force F in dependence of draw-down velocity v is recorded.

The test procedure is performed in a standard climatized room with controlled room temperature of 23° C. The Rheotens apparatus 1 is combined with an extruder/melt pump 3 for continuous feeding of the melt strand 2. The extrusion temperature is 200° C.; a capillary die with a diameter of 2 mm and a length of 6 mm is used an the acceleration of the melt strand 2 draw-down is 120 mm/$s^2$. The extrusion rate of the strand is 5 mm/s. The strand length (i.e. the distance between die and wind up rolls) is 100 mm.

The schematic diagram in FIG. 1 shows in an exemplary fashion the measured increase in haul-off force F (i.e. "melt strength") vs. the increase in draw-down velocity v (i.e. "drawability").

2. Preparation of Foamed Compositions 2.1 Compositions

As a component (A). a commercial grade Daploy™ WB130HMS has been used (in the following denoted as "HMS-PP"). It has a density of 915 kg/$m^3$ (ISO 1183). Further properties of this material are indicated in Table 1.

As a component (B), a commercial grade BorECO™ BA222E has been used (in the following denoted as "Impact-PP"). It has a density of 915 kg/$m^3$ (ISO 1183). Further properties of this material are indicated in Table 1.

TABLE 1

Physical properties of the polypropylenes used

| Property | Unit | Method | Component (B) | Component (A) |
|---|---|---|---|---|
| Type | | | Impact PP | High melt strength PP |
| $MFR_2$ | g/10 | ISO1133 | 0.25 | 2.0 |
| TENSILE MODULUS | MPa | ISO527 | 1960 | 1860 |
| TENSILE STRESS AT YIELD | MPa | ISO527 | 33 | 41 |
| TENSILE STRAIN AT YIELD | % | ISO527 | 8 | 6.5 |
| TENSILE STRENGTH | MPa | ISO527 | 33 | 41 |
| TENSILE STRAIN AT TENSILE STRENGTH | % | ISO527 | 8 | 6.5 |
| TENSILE STRESS AT BREAK | MPa | ISO527 | 29 | 32 |
| TENSILE STRAIN AT BREAK | % | ISO527 | 200 | 13 |
| Charpy Notched Impact Strength (+23° C.) | $kJ/m^2$ | ISO179/1eA | 50 | 3 |
| Charpy Notched Impact Strength (−20° C.) | $kJ/m^2$ | ISO179/1eA | 4 | 1 |

Glass fibres have been dosed through a commercial masterbatch Nepol GB415HP (Borealis A/S, Denmark). It is referred to PP-GF hereafter. It contains 42 wt % of glass fibres. The PP is impregnated with the glass fibres, shaped, cooled and subsequently cut to rods of approximately 1 to 10 mm. Such prepared Nepol masterbatch has been dosed through the hopper of the foaming extruder.

As cell nucleating agent (NA) a commercial masterbatch has been used (Hydrocerol CF40, manufactured from Clariant) which is a chemical foaming and nucleating agent masterbatch for foaming of thermoplastic resins. Effective components: 40%.

The amounts of the different components used for the foamed compositions are given in Table 2.

2.2 Foaming Line

Figure 2:
FIG. 2 shows the screw configuration used in the extruder for extruding of the compositions.

A twin screw foaming line has been used for the present purpose. The extruder is a Berstorff ZE25 co-rotating twin screw extruder, with a screw diameter of 25 mm, a length/diameter ratio of 40, and a screw configuration as disclosed in FIG. 2. The screw speed is adjusted to 250 rpm. The temperature settings of the extruder have been adjusted according to the following scheme:

| | Zone | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Temp./° C. | 30 | 240 | 220 | 180 | 180 | 180 | 180 | 170 | 170 | 170 | 165 | 165 |

The feeding was done with a gravimetric feeder Schenk Multifeeder. The physical blowing agent is dosed in its gaseous state at a L/D ratio of 10. The dosing of the foaming agent is monitored with a flow-meter Bronkhorst (F-201AC-FB-22-V).

The extruder is attached to a flat die, 300 mm width, 0.2 mm gap and set to a temperature of 170° C.

Example 1 (Comparative)

As a comparative example, a foam with physical blowing agent (PBA) and without glass fibres was prepared with the foaming line as described above, using a recipe of 69.3 wt % impact-PP, 30 wt % HMS-PP, no glass fibres, 0.5 wt % nucleating agent (all through the hopper), and dosing 0.2 wt % of physical blowing agent into the melt (Table 2). Subsequent foam has a density of 580 kg/m³, a glass fibre content of 0 wt %, a stiffness in extrusion direction of 895 MPa and a k-value of 0.12 W/mK (Table 3).

Example 2

As an example according to the invention, a foam with physical blowing agent and with glass fibres has been prepared with the foaming line as described above, using a recipe of 40.7 wt % impact-PP, 30 wt % HMS-PP, 28.6 wt % PP-GF, 0.5 wt % NA (all through the hopper), and dosing 0.2 wt % of physical blowing agent into the melt. Subsequent foam has a density of 560 kg/m³, a glass fibre content of 12 wt %, a stiffness in extrusion direction of 1381 MPa and a k-value of 0.091 W/mK.

TABLE 2

Compositions of Examples

| Property | Unit | Example 1 (Comparative) | Example 2 |
|---|---|---|---|
| PP-B | wt. % | 69.3 | 40.7 |
| PP-HMS | wt. % | 30.0 | 30.0 |
| PP-GF masterbatch | wt. % | 0.0 | 28.6 |
| PBA | wt. % | 0.2 | 0.2 |
| NA | wt. % | 0.5 | 0.5 |

2.3 Results

The results of the measurement of the physical properties of the foamed compositions of Comparative Example 1 and Example 2 are given in Table 3.

TABLE 3

Results

| Property | Unit | Comparative Example 1 | Example 2 |
|---|---|---|---|
| Foam DENSITY | kg/m³ | 580 | 560 |
| Compound unfoamed Density | kg/m³ | 905 | 981 |

TABLE 3-continued

Results

| Property | Unit | Comparative Example 1 | Example 2 |
|---|---|---|---|
| Glass Fibres | Wt. % | 0 | 12 |
| K-VALUE Extrusion direction | W/mK | 0.117 | 0.091 |
| TENSILE MODULUS | MPa | 895 | 1381 |
| TENSILE STRESS at Yield | MPa | 19.3 | 18.9 |
| TENSILE STRENGTH | MPa | 19.3 | 18.1 |

TABLE 3-continued

| Property | Unit | Comparative Example 1 | Example 2 |
|---|---|---|---|
| TENSILE STRESS at Break Transverse to extrusion direction | MPa | 18.5 | 17.8 |
| TENSILE MODULUS | MPa | 684 | 703 |
| TENSILE STRESS at Yield | MPa | 13.9 | 10.7 |
| TENSILE STRENGTH | MPa | 13.9 | 10.7 |
| TENSILE STRESS at Break | MPa | 13.7 | 10.5 |

The invention claimed is:

1. A foamed polypropylene composition comprising a propylene homo- and/or copolymer and glass fibres, wherein
   (i) the composition has a density of 50 to 900 kg/m³,
   (ii) the tensile modulus $tm_{(extrusion\ direction)}$ measured according to ISO 527 in extrusion direction and the k-value measured according to ASTM C-518 satisfy the relation:

$$tm_{(extrusion\ direction)}[MPa]/k[W/mK] \geq 9000\ MPa \cdot mK/W;$$

wherein the glass fibres are present in an amount of 12 wt % of the composition; and wherein the composition has a k-value measured according to ASTM C-518 in the range of from 0.01 W/mK to 0.091 W/mK;
   wherein the propylene homo- and/or copolymer comprises
   (A) 5 to 80 wt. % of a propylene block copolymer which shows strain hardening behaviour, and
   (B) 20 to 95 wt. % of an isomeric polypropylene having a Charpy Notched Impact Strength at 23° C. measured according to ISO 179/1eA of 25 kJ/m² or higher; and
   (C) 0.1 to 5 wt. % of an alpha-nucleating agent;
   wherein the foamed composition is produced using a physical or chemical foaming agent.

2. A foamed polypropylene composition according to claim 1 wherein
   (iii) the tensile modulus $tm_{(transverse)}$ measured according to ISO 527 in transverse to extrusion direction and the k-value measured according to ASTM C-518 satisfy the relation:

$$tm_{(transverse)}[MPa]/k[W/mK] \geq 6000\ MPa \cdot mK/W.$$

3. A foamed polypropylene composition according to claim 1 wherein the average length of the glass fibres is between 0.2 to 50 mm.

4. A foamed polypropylene composition according to claim 1 wherein component (B) is a homopolymer with a stereospecificity index >98% and a $MFR_2$ of 0.05 to 10 g/10min and/or a copolymer of 99.9 to 80 wt. % propylene and 0.1 to 20 wt. % of ethylene or an alpha-olefin with 4 to 18 carbon atoms with a stereospecificity index of >96% and a $MFR_2$ of 0.05 to 10 g/10 min.

5. A foamed polypropylene composition according to claim 1 wherein at least one of components (A) and (B) have a tensile modulus measured according to ISO 527 of 1500 MPa or higher.

6. A method for producing a thermal insulating layer, comprising using the foamed polypropylene composition of claim 1 to produce the thermal insulating layer.

7. The method of claim 6, further comprising applying the thermal insulation layer to a steel pipe.

8. An article comprising the foamed polypropylene composition according to claim 1.

9. An article according to claim 8 wherein the article is a steel pipe.

10. A foamed polypropylene composition according to claim 1 wherein the average length of the glass fibres is between 0.5 to 25 mm.

11. A foamed polypropylene composition according to claim 1 wherein the average length of the glass fibres is between 1.0 to 20 mm.

12. A foamed polypropylene composition according to claim 1 wherein the tensile modulus $tm_{(extrusion\ direction)}$ measured according to ISO 527 in extrusion direction and the k-value measured according to ASTM C-518 satisfy the relation:

$$tm_{(extrusion\ direction)}[MPa]/k[W/mK] \geq 13000\ MPa \cdot mK/W;\ and$$

wherein the tensile modulus $tm_{(transverse)}$ measured according to ISO 527 in transverse to extrusion direction and the k-value measured according to ASTM C-518 satisfy the relation:

$$tm_{(transverse)}[MPa]/k[W/mK] \geq 7000\ MPa \cdot mK/W.$$

13. The foamed polypropylene composition of claim 1, wherein the composition has a k-value measured according to ASTM C-518 of 0.091 W/mK.

14. The foamed polypropylene composition of claim 13, wherein the composition comprises:
   40.7 wt % of the propylene block copolymer which shows strain hardening behavior;
   30.0 wt % of the isomeric polypropylene having a Charpy Notched Impact Strength at 23° C. measured according to ISO 179/1eA of 25 kJ/m² or higher;
   0.2 wt % of a physical blowing agent; and
   0.5 wt % of the nucleating agent.

15. A foamed polypropylene composition comprising a propylene homo- and/or copolymer and glass fibres, wherein
   (i) the composition has a density of 50 to 900 kg/m³,
   (ii) the tensile modulus $tm_{(extrusion\ direction)}$ measured according to ISO 527 in extrusion direction and the k-value measured according to ASTM C-518 satisfy the relation:

$$tm_{(extrusion\ direction)}[MPa]/k[W/mK] \geq 9000\ MPa \cdot mK/W;$$

wherein the glass fibres are present in an amount of 12 wt % of the composition; and wherein the composition has a k-value measured according to ASTM C-518 of 0.091 W/mK;
   wherein the propylene homo- and/or copolymer comprises
   (A) 40.7 wt. % of a polypropylene block copolymer which shows strain hardening behaviour, and
   (B) 30.0 wt. % of an isomeric polypropylene having a Charpy Notched Impact Strength at 23° C. measured according to ISO 179/1eA of 25 kJ/m² or higher;
   (C) 0.2 wt % of a physical blowing agent; and
   (D) 0.5 wt % of a nucleating agent.

\* \* \* \* \*

UNITED STATES PATENT AND TRADEMARK OFFICE
CERTIFICATE OF CORRECTION

PATENT NO.        : 8,729,144 B2
APPLICATION NO.   : 12/097219
DATED             : May 20, 2014
INVENTOR(S)       : Anker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this

Twenty-ninth Day of September, 2015

Michelle K. Lee
*Director of the United States Patent and Trademark Office*